June 18, 1929.  N. C. BREMER  1,717,365
CHAIN LUBRICATOR
Filed May 11, 1927
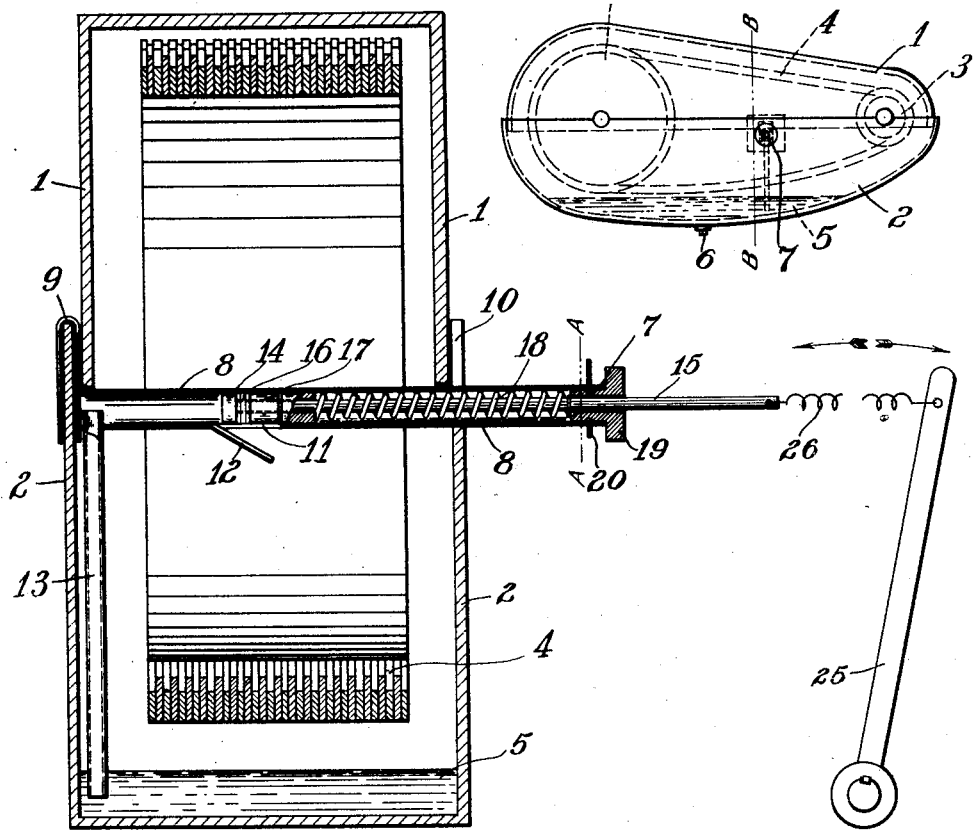
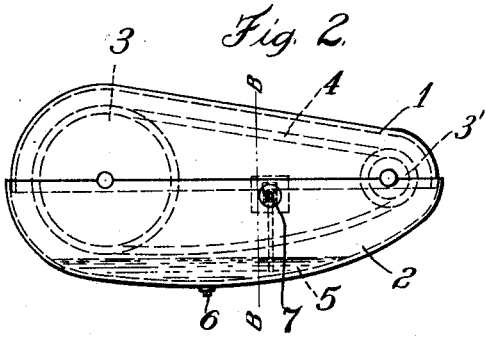
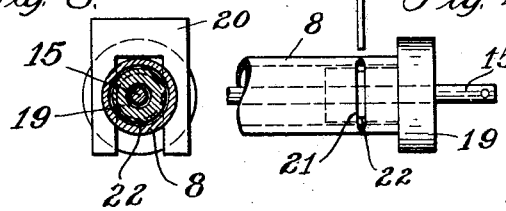
Norman C. Bremer
INVENTOR.
BY Robert V. Morse
ATTORNEY.

Patented June 18, 1929.

1,717,365

UNITED STATES PATENT OFFICE.

NORMAN C. BREMER, OF ITHACA, NEW YORK.

CHAIN LUBRICATOR.

Application filed May 11, 1927. Serial No. 190,593.

This invention relates to the lubrication of machinery, and is especially applicable to the lubrication of power chains and similar power transmission devices such as are used in mills and factories. Such power chains normally run at fairly high speeds, and it is not desirable to run them directly in a bath of oil, owing to the drag and power loss. While no great amount of lubrication is required for a power chain under normal conditions, it is desirable that the lubricant be applied in such a way as to penetrate to the pins or joints where the wear occurs, and this may be done by periodically dropping oil on the chain while it is in operation.

With this in view, this invention has for its object the provision of a simple and effective means to pump oil upon the chain as it runs. Other objects are to make a lubricator which can be readily operated by any adjacent machinery, such as is found in mills and factories; to make a device which is easily installed, which can be adapted to chain cases of various widths, and which has no valves or other delicate parts, so that it will be reliable in operation. A further object is to provide a lubricator which will deliver the oil where it is wanted, without undue waste or splashing; and various other objects as will become apparent as the description proceeds.

Referring now to the drawings, Fig. 1 is an elevation in cross-section showing the general construction of the lubricating device as mounted in a chain case to lubricate the chain.

Fig. 2 is a side elevation illustrating the manner of mounting the lubricator between two sprockets in a chain case.

Fig. 3 is a detail, partly in cross-section, showing one method of locking the pump shaft bearing bushing in place.

Fig. 4 is a side elevation of the same showing the locking clip removed.

Similar reference numerals refer to similar parts thruout the various views.

While the present invention may be applied to the lubrication of various types of machinery, it will be described by way of illustration in connection with the lubrication of power chain drives of the link belt or silent chain type.

Referring first to Fig. 2, a chain case consisting of an upper part or cover 1 and a lower part or base 2 is illustrated, within which is located a pair of sprockets 3 and 3' on which run the chain 4 as indicated in dotted lines. The upper part 1 of the chain case is fitted within the lower part 2 so that any oil 5 which is thrown about will drip back into the bottom of part 2, which is utilized as an oil reservoir usually having a drain plug 6. The level of the oil in this reservoir is preferably below the lowest point of the chain drive so that power will not be wasted in splashing the oil about unnecessarily. Properly designed chain drives if protected from dirt do not require a great amount of lubrication but it is desirable that they be supplied with a little oil at more or less regular intervals from time to time and for that purpose the following pump device 7 is provided:

Referring now more particularly to Fig. 1, which is a transverse cross-section on the line B—B of Fig. 2, the pump device, designated in general by the reference numeral 7, consists of a cylinder or barrel 8 closed at one end by a plate 9 which is bent over to form a clip by which the cylinder 8 may be supported from one side of the chain case base 2. The cylinder 8 is supported on the other side of the chain case by resting in the slot 10, which is cut in the side of the chain case base 2. The cylinder 8 may be held in place vertically by the upper part of the chain case 1. In order that the same size pump may accommodate itself to various widths of chain cases, the cylinder 8 is made somewhat longer than the average width of such cases so that it usually extends somewhat beyond the case, as shown in the drawing. A slot 11 is cut in the lower part of the cylinder 8 above the lip 12; and the suction pipe 13, of considerably smaller diameter than the cylinder 8, extends from a point inside the cylinder 8 down to a point below the level of the oil 5 in the base 2. The upper end of the suction pipe 13 extends above the bottom of the cylinder 8 in order that oil that is drawn up will be trapped inside the cylinder 8 and not flow back thru the pipe 13. In order to draw the oil up the suction pipe 13 a piston 14 mounted on the piston rod 15 is reciprocated slowly back and forth in the cylinder 14, one end of its stroke being close to the suction pipe 13 and the other end of the stroke being somewhere beyond the base of the lip 12 so as to uncover the slot 11 thus permitting the oil to run out and drip off the end of the lip 12 on to the lower strand of the chain 1. The piston 14 preferably consists of a head solidly attached to the rod 15 behind which may be placed a number of leather washers 16 held in place by a metal bushing 17 which is free to slide on the rod 15 but is pressed against the washers 16 thru the force of the compression spring 18. The pressure of the bushing 17 against the leather washers 16 tends to keep them expanded into air-tight contact with the walls of the cylinder 8—the leather being normally well soaked with oil. The other end of the compression spring 18 abuts against the fixed bearing bushing 19 which may be located in the end of the cylinder 8 by any suitable means, such as the clip 20 illustrated in Fig. 3 and Fig. 4. This clip 20 is bifurcated and passes thru a pair of slots 21 in the walls of the cylinder 8 and into a groove 22 cut in the bushing 19, thus holding the bushing 19 against longitudinal movement. The piston rod 15 which slides freely thru the bushing 19 may be reciprocated by connection to any suitable portion of the machinery in the mill where the chain drive is located, it being connected preferably to some rather slow moving oscillating element as is illustrated diagrammatically by the arm 25. As the stroke of such an element 25 will often be longer than is necessary for the piston 14 and it is highly desirable that the driving connection shall not require any close adjustment and shall be able to accommodate itself to various degrees of travel as will occur in practice, the driving connection is preferably of a flexible type, such as a coil tension spring 26. This will stretch to accommodate excess travel in one direction and will slack to accommodate excess travel in the other direction. The end of the spring 26 need not of course be directly connected to the reciprocating element 25 but the power may be led around corners by cords and pulleys if desired, as will be apparent to those skilled in the art.

The operation of the device is as follows: When the driving connection 26 is slack the piston 14 is normally held close to the end of the suction pipe 13 by the compression spring 18. When the driving connection 26 is pulled by the action of the machinery, the piston 14 is drawn back against the compression of the spring 18 creating a suction within the barrel 8. As the tube 13 is of relatively small diameter, the oil 5 is quickly sucked up its full length and overflows into the chamber of the cylinder 8. When the stroke of the piston 14 passes the base of the lip 12 it uncovers the slot 11 allowing air to enter the cylinder 8 and the oil to flow by gravity down the lip 12 and drip upon the lower strand of the chain 1. The piston 14 usually travels considerably beyond the slot 11 but without any further action so far as the pumping is concerned. On the return stroke when the piston 14 passes beyond the end of the slot 11 adjacent the base of the lip 12, it traps the air in the cylinder 8 and forces it down the pipe 13 from which it bubbles up thru the oil 5 and escapes. The pump is then in condition for another suction stroke and the cycle is repeated.

While I have in the foregoing described a preferred embodiment of my invention, it will be understood that it is only by way of illustration and that the apparatus is susceptible to various adaptations and modifications to adapt it to various installations as will be apparent to those skilled in the art, without departing from the scope of the invention as specified in the following claims:

1. In a mechanical lubricator, the combination of a case containing machinery to be lubricated and having an oil reservoir located below said machinery, a valveless pump located above the portion of the machinery to be lubricated, an intake pipe extending from said oil reservoir to said pump, said intake pipe being of sufficiently smaller diameter relative to the pump so that oil may be drawn up into the pump on a single stroke of the pump, and means for directing at least a portion of the oil so drawn up so that it may fall upon the portion of the machinery to be lubricated.

2. In a mechanical lubricator, the combination of a case containing machinery to be lubricated and having an oil reservoir located below said machinery, a valveless pump located transversely in the case above the level of the oil reservoir, an intake pipe extending from said oil reservoir up to the pump, means for operating said pump on the suction stroke, spring means for operating said pump on the return stroke, and means for directing at least a portion of the oil pumped so that it may fall by gravity upon the machinery to be lubricated.

3. In a mechanical lubricator, the combination of a case containing machinery to be lubricated and having an oil reservoir located below said machinery, a valveless pump located transversely in the case above the level of the oil reservoir, an intake pipe extending from said oil reservoir up to the pump, a driving means including a flexible tension member which may drive said pump on the suction stroke and slack in case of overtravel on the return stroke, spring means for operating the pump on the return stroke, and means for directing at least a portion of the oil pumped so that it may fall by gravity upon the machinery to be lubricated.

4. In a mechanical lubricator, the combination of a pump cylinder, a piston, a piston rod, driving means for pulling the piston in one direction, spring means for returning the piston in the other direction, a suction intake arranged to form a trap within the pump cylinder, and an outlet located on the lower side of the cylinder where it may be uncovered by the piston in its stroke, whereby lubricant trapped in the cylinder may flow out and drop upon the machinery to be lubricated.

5. In a mechanical lubricator, the combination of a case having a slot in one side, a pump cylinder having a clip adapted to hook over one side of the case, said cylinder extending across the case and thru the slot in the other side, an oil reservoir in the bottom of the case, a suction pipe extending from the cylinder to the oil reservoir, a cover adapted to fit over said case and inside the walls thereof to hold the pump cylinder in place in the slot, and pumping means cooperating with the cylinder to draw oil from the reservoir.

6. In a mechanical lubricator for chain drives, a case adapted to contain a chain drive, a pump cylinder extending transversely across the case between the upper and lower strands of the chain and having an outlet from which oil may drop upon the lower strand of the chain, an oil reservoir located below the lower strand of the chain, a suction pipe extending from the oil reservoir to the pump, reciprocating pumping means in said cylinder, and driving means for operating said pumping means.

7. In a mechanical lubricator for chain drives, a case adapted to contain a chain drive, said case having an upper portion fitting inside of a lower portion, said lower portion including an oil reservoir, a pump cylinder extending transversely across the case between the upper and lower strands of the chain and secured against longitudinal motion, a piston within said cylinder adapted for longitudinal motion, a spring yieldingly driving said piston in one direction, a reciprocating tension drive for moving said piston in the opposite direction against the spring, a suction intake pipe connecting the pump cylinder to the oil reservoir, and an outlet intermediate the ends of said cylinder, whereby the oil pumped may be discharge so as to fall upon the lower strand of the chain.

8. In a mechanical lubricator, the combination of a pump cylinder, a piston, a piston rod, means for reciprocating the piston and piston rod, a suction intake at one end of the cylinder, a slot in the lower side of said cylinder located so that it will be uncovered by the stroke of the piston, and a downwardly projecting lip adjacent said slot from which the lubricant escaping from the slot may drip.

9. In a mechanical lubricator, the combination of a pump cylinder, a piston, a piston rod, means for reciprocating the piston and piston rod, a suction intake at one end of the cylinder, a trap whereby at least a portion of the lubricant drawn up the intake will be retained within the cylinder and prevented from flowing back down the intake, a slot in the lower side of said cylinder located so that it will be uncovered by the stroke of the piston, and a downwardly projecting lip adjacent said slot from which the lubricant escaping from the slot may drip.

10. In a mechanical lubricator, the combination of a pump cylinder, a suction intake pipe of sufficiently smaller diameter relative to the pump cylinder so that oil may be drawn into the cylinder on a single stroke of the pump, said intake pipe extending within the pump cylinder so as to form a trap, a piston and a piston rod mounted for travel within said cylinder, flexible expansible washers mounted on said rod behind said piston, a slidable bushing mounted on said rod behind said washers, and a spring pressing said slidable bushing against said washers, said spring also serving to move the piston in one direction of its motion, means for moving the piston in the other direction, and an opening on the lower side of the cylinder intermediate the ends of the stroke of the piston thru which lubricant drawn into the cylinder may escape.

11. In a mechanical lubricator, the combination of a case, a pump cylinder supported transversely in the case and extending thru one wall of the case, a suction intake pipe at one end of the cylinder and extending downward to the lubricant in the lower portion of the case, an outlet opening in the lower side of the cylinder, a piston mounted on a piston rod and adapted to uncover said outlet opening in its stroke, a bushing in one end of the cylinder and secured therein against longitudinal motion, the piston rod passing thru said bushing, a compressing spring between the said bushing and the piston, and driving means for operating the piston rod.

12. In a mechanical lubricator for chain drives, the combination of a case adapted to contain a chain drive, the lower portion of the case forming an oil reservoir below the lower strand of the chain drive, a pump cylinder extending transversely across the case between the upper and lower strands of the chain drive, an intake pipe extending from the oil reservoir to the pump cylinder, said intake pipe being of sufficiently smaller diameter than the pump cylinder so that oil may be drawn up into the cylinder on a single stroke of the pump, means for retaining at least a portion of the oil so drawn up in the pump cylinder so that it will not flow back down the intake pipe, an outlet in the lower side of the pump cylinder, a piston having a stroke which over-travels said outlet so that oil may escape therefrom and fall upon the lower strand of the chain drive, yielding means for driving the piston in one direction, a flexible tension drive for moving the piston in the other direction, whereby the piston may be reciprocated to pump the oil and lubricate the chain drive.

In testimony whereof, I have hereunto signed my name this 5th day of May, 1927.

NORMAN C. BREMER.